United States Patent
Pecar et al.

(10) Patent No.: US 10,557,513 B2
(45) Date of Patent: Feb. 11, 2020

(54) DAMPERS

(71) Applicant: Titus d.o.o. Dekani, Dekani (SI)

(72) Inventors: David Pecar, Pobegi (SI); Valter Svara, Izola (SI); Kozlovic Danijel, Dekani (SI)

(73) Assignee: Titus d.o.o. Dekani, Dekani (SI)

( * ) Notice: Subject to any disclaimer, the term of this patent is extended or adjusted under 35 U.S.C. 154(b) by 0 days.

(21) Appl. No.: 15/749,535

(22) PCT Filed: Jul. 29, 2016

(86) PCT No.: PCT/EP2016/068209
§ 371 (c)(1),
(2) Date: Feb. 1, 2018

(87) PCT Pub. No.: WO2017/029102
PCT Pub. Date: Feb. 23, 2017

(65) Prior Publication Data
US 2018/0231092 A1    Aug. 16, 2018

(30) Foreign Application Priority Data

Aug. 17, 2015    (GB) .................................. 1514574.1

(51) Int. Cl.
*F16F 9/36*    (2006.01)
*F16F 9/32*    (2006.01)

(52) U.S. Cl.
CPC ............ *F16F 9/368* (2013.01); *F16F 9/3242* (2013.01); *F16F 2230/30* (2013.01)

(58) Field of Classification Search
CPC .......... F16F 9/3242; F16F 9/362; F16F 9/363; F16F 9/366; F16F 9/368; F16F 9/49; F16F 2230/30

(Continued)

(56) References Cited

U.S. PATENT DOCUMENTS 3,937,450 A * 2/1976 Bauer .................. F16F 9/0227
267/113
4,110,868 A * 9/1978 Imazaike ................. E05F 5/10
16/66

(Continued)

FOREIGN PATENT DOCUMENTS

DE    102005044578 B3    5/2007
WO    WO2012129884 A1    10/2012

*Primary Examiner* — Thomas W Irvin
(74) *Attorney, Agent, or Firm* — Alan D. Kamrath; Karin L. Williams; Mayer & Williams PC

(57) ABSTRACT

A piston and cylinder type damper is provided, with a cylinder (11) having a piston assembly (15) mounted for reciprocal movement therein. The piston assembly (15) divides the cylinder (11) into two separate chambers (12a, 12b), with a restricted flow path (30, 31) for passage therebetween of damping fluid contained within the cylinder. A piston rod (13) is mounted for reciprocal movement with respect to the cylinder (11) and acts via a first one of the chambers (12a) on the piston assembly (15) in a first direction. A seal assembly (17) is provided for sealing between the piston rod (13) and the cylinder (11) in order to retain damping fluid in the first chamber (12a). The seal assembly (17) is movable axially with respect to the cylinder (11), with the cylinder further including a centering device (24) for assisting alignment of the seal assembly (17).

5 Claims, 3 Drawing Sheets

(58) Field of Classification Search
USPC .................................... 188/322.16, 322.17
See application file for complete search history.

(56) References Cited

U.S. PATENT DOCUMENTS

| | | | | |
|---|---|---|---|---|
| 4,796,871 A * | 1/1989 | Bauer | ................ | F16F 9/49 |
| | | | | 188/282.1 |
| 5,102,109 A * | 4/1992 | Schnetz | ............ | F16F 9/512 |
| | | | | 188/282.1 |
| 5,157,806 A | 10/1992 | Wartian | | |
| 5,485,987 A * | 1/1996 | Jobelius | ............ | F16F 9/0218 |
| | | | | 188/322.17 |
| 5,735,371 A * | 4/1998 | Jobelius | ............ | F16F 9/0218 |
| | | | | 188/276 |
| 6,318,526 B1 | 11/2001 | Kruckemeyer et al. | | |
| 6,626,274 B2 * | 9/2003 | Pfundstein | .......... | F16F 9/46 |
| | | | | 188/266.5 |
| 7,004,292 B2 * | 2/2006 | Schilz | ............ | F16F 9/3242 |
| | | | | 188/276 |
| 7,032,727 B2 * | 4/2006 | Vanspauwen | ......... | F16F 9/49 |
| | | | | 188/282.5 |
| 7,628,257 B1 * | 12/2009 | Lu | ................ | F16F 9/3415 |
| | | | | 188/282.6 |
| 7,753,179 B2 | 7/2010 | Robertson | | |
| 7,975,994 B2 * | 7/2011 | Born | ................ | F16F 9/483 |
| | | | | 188/284 |
| 8,127,901 B1 | 3/2012 | Lu | | |
| 8,418,820 B2 * | 4/2013 | Kim | ................ | F16F 9/49 |
| | | | | 188/284 |
| 9,416,570 B1 * | 8/2016 | Colombo | .......... | F16F 13/002 |
| 9,856,863 B2 * | 1/2018 | Robertson | .......... | F16F 9/3228 |
| 2003/0136620 A1 * | 7/2003 | Krog | ............ | F15B 15/1433 |
| | | | | 188/300 |
| 2004/0079225 A1 * | 4/2004 | Reiser | ............ | F16F 9/3242 |
| | | | | 92/165 R |
| 2010/0201052 A1 * | 8/2010 | Katayama | .......... | F16F 9/0218 |
| | | | | 267/113 |
| 2018/0266512 A1 * | 9/2018 | Zimmer | ............ | F16F 9/50 |

* cited by examiner

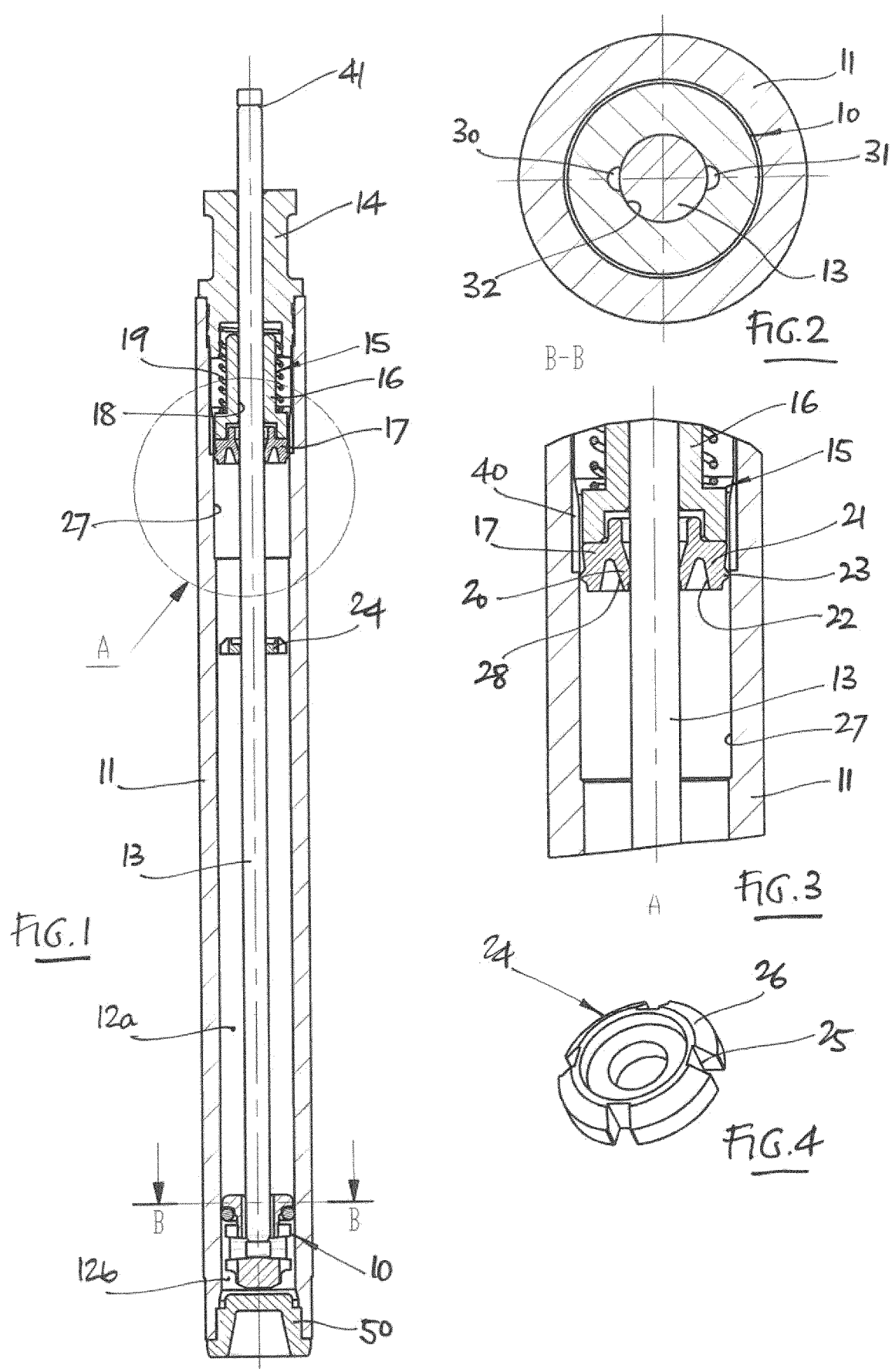

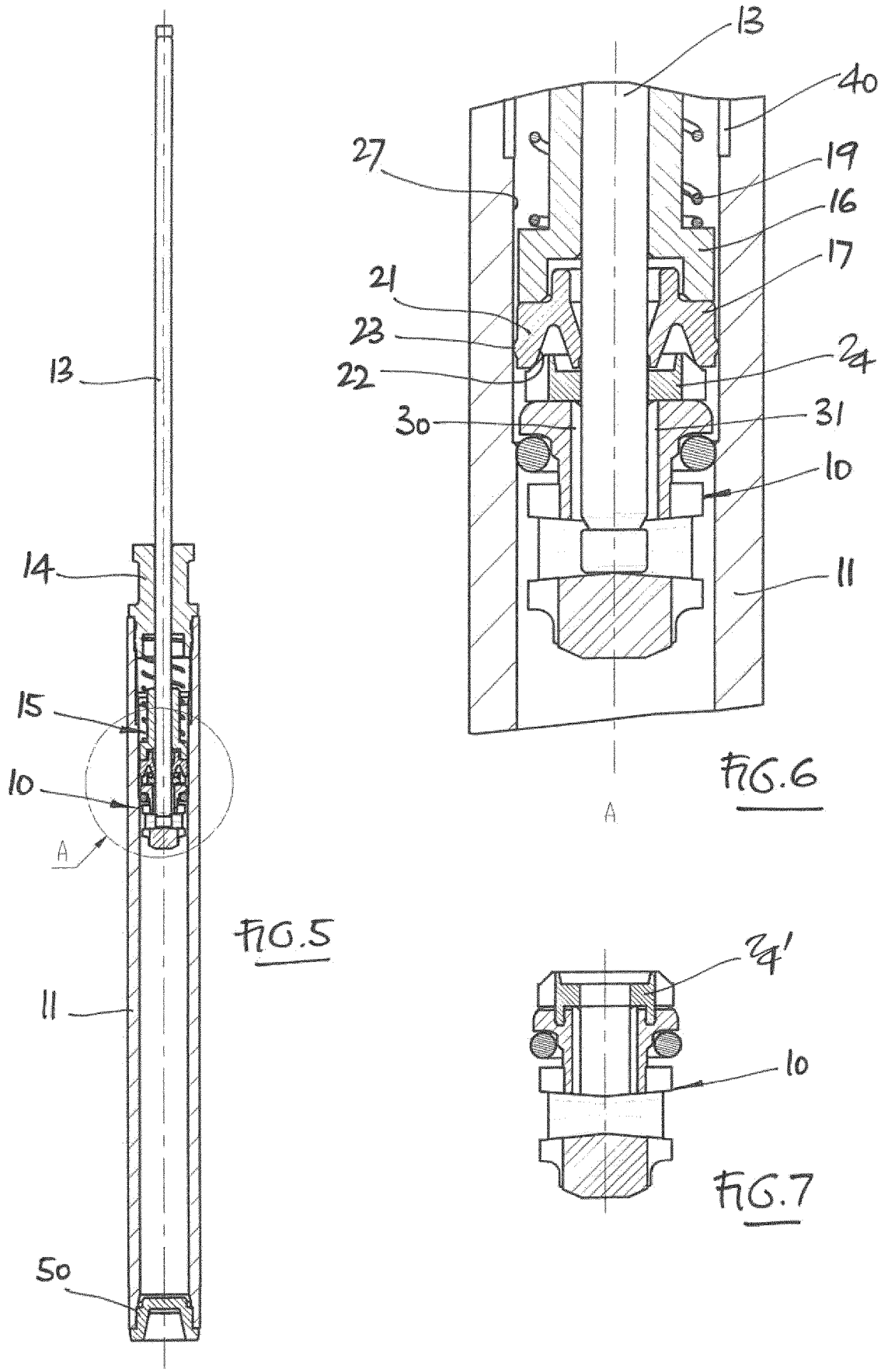

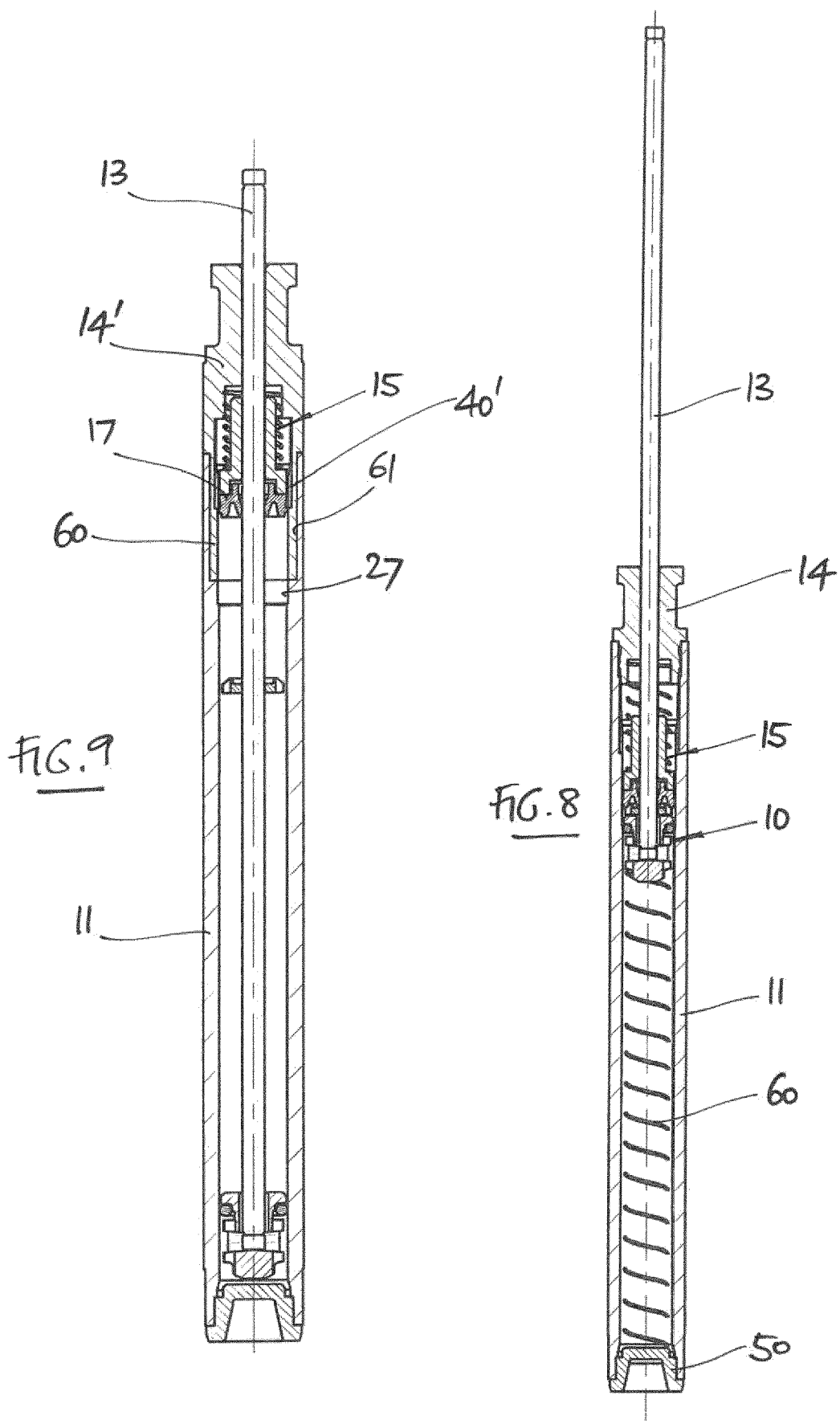

DAMPERS

This invention relates to dampers.

According to the invention there is provided a piston and cylinder type damper having a cylinder with a piston assembly mounted for reciprocal movement therein and dividing the cylinder into separate chambers with a restricted flow path for passage therebetween of damping fluid contained within the cylinder, and a piston rod mounted for reciprocal movement with respect to the cylinder and acting via a first one of said chambers on the piston assembly in at least a first direction, with a seal assembly being provided for sealing between the piston rod and the cylinder or a part attached thereto in order to retain damping fluid in said first chamber, with said seal assembly being movable axially with respect to the cylinder, and further comprising a centering device for assisting alignment of the seal assembly.

The invention also provides a piston and cylinder type damper having a cylinder with a piston assembly mounted for reciprocal movement therein and dividing the cylinder into separate chambers with a restricted flow path for passage therebetween of damping fluid contained within the cylinder, and a piston rod mounted for reciprocal movement with respect to the cylinder and acting via a first one of said chambers on the piston assembly in at least a first direction, with a seal assembly being provided for normally sealing between the piston rod and the cylinder or a part attached thereto in order to retain damping fluid in said first chamber, the damper further comprising means for allowing a bleed off of air from said first chamber.

By way of example, embodiments of the invention will now be described with reference to the accompanying drawings, in which:

FIG. 1 is a cross-sectional view of a first form of damper according to the invention with its piston rod fully retracted, FIG. 2 is a cross-sectional view through the piston assembly of the damper of FIG. 1, FIG. 3 is a detail view of the sealing element of the damper of FIG. 1, FIG. 4 shows the collar of the damper of FIG. 1, FIG. 5 is a cross-sectional view of the damper of FIG. 1 with its piston rod fully extended, FIG. 6 is a detail view of the piston assembly and sealing element of the damper of FIG. 1 in the fully extended position of the piston rod, FIG. 7 shows an alternative form of collar, FIG. 8 is a cross-sectional view of a second form of damper according to the invention, and FIG. 9 is a cross-sectional view of a third form of damper according to the invention.

The damper seen in FIG. 1 is a linear piston and cylinder type damper having a piston assembly 10 that is reciprocably movable within an elongate cylinder 11. The cylinder 11 contains a damping fluid, typically oil, with the piston assembly 10 effectively dividing the interior of the cylinder into separate chambers 12a, 12b (referred to herein for convenience as "upper" and "lower" chambers), with pathways through the piston assembly providing fluid communication between the two chambers, in known manner.

The piston assembly 10 includes a restricted passageway for flow of fluid into the upper chamber 12a on the working (compression) stroke of the damper to provide a damping resistance to the inward movement of the piston rod 13, in known manner. Here the restricted passageway is formed by two axially extending grooves 30, 31 in a bore 32 of the body of the piston assembly 10 that receives the inner end of the piston rod 13. The grooves 30, 31 are arranged on diametrically opposite sides of the piston rod 13, as seen in FIG. 2. Much larger passageways are exposed across the piston assembly 10 on the return stroke of the damper, in known manner, so that there is practically no resistance to the movement of the piston rod 13 out of the cylinder 11.

The piston assembly 10 is acted on by the inner end of the piston rod 13. The outer end of the piston rod 13 extends out of one end of the cylinder 11 via a cap 14, which provides lateral guidance for the reciprocal axial movement of the piston rod. At its other end, the cylinder 11 is closed off by a plug 50. The damper is arranged in use with the free end of the piston rod 13 in the path of movement of a component such as a drawer or door so as to damp its closing motion. In this case, the free end of the piston rod 13 is designed to be connected to another component, for which purpose it is formed with a groove 41 for the attachment of a circlip or the like.

The upper chamber 12a, ie the chamber between the piston assembly 10 and the cap 14, contains a mobile seal assembly 15. The seal assembly 15 comprises a body 16 on which is mounted a sealing element 17. The body 16 has a bore 18 therethrough to receive the piston rod 13 and is freely movable along it. A compression spring 19 is arranged between the cap 14 and the body 16 and acts to bias the body away from the cap.

The sealing element 17 has an inner annular lip 20 to engage the piston rod 13 in a fluid tight manner and an outer annular lip 21 to engage the inner bore of the cylinder 11 in a fluid tight manner. The sealing element 17 thus serves to prevent fluid from escaping from the upper chamber 12a.

The seal assembly 15 is pressed by the biassing force of spring 19 onto the upper surface of the fluid in the upper chamber 12a. The quantity of fluid in the upper chamber 12a will vary as the piston assembly 10 moves in the cylinder 11, due to variations in the volume taken up by the piston rod 13 within the chamber. The seal assembly 15 will thus move up and down with the variation in the fluid level. In this way, it is able to act to compensate for changes in the fluid volume in the upper chamber 12a in operation. Floating seals of this nature are generally known in the art.

In the assembly seen in FIG. 3, the outer lip 21 of the sealing element 17 has an inner profile 22 that tapers in the axial direction. Also, the outer lip 21 is conveniently provided with a circumferentially extending rib 23, ensuring essentially linear contact with the bore 27 of the cylinder 11. The inner lip 20 of the sealing element 17 also preferably has a tapering profile 28, as seen in FIG. 3.

Here, a collar 24 is mounted on the piston rod 13 between the piston assembly 10 and the cap 14. The collar 24 fits snugly on the piston rod 13 but is freely movable along it. The collar 24 has a series of cutaways 25 around its periphery to allow for fluid to pass by it.

One of the functions of the collar 24 is to act as a deflector for fluid passing through the grooves 30, 31 on the working stroke of the damper. The flow of fluid through these grooves 30, 31 will be high if the damper experiences a large impact force, for example from a slammed drawer or door. If the jets of fluid that would result from such flows were allowed to act directly on the sealing element 17, there may be a tendency for it to distort, with consequent loss of sealing integrity. The collar 24 serves to deflect such flows radially outwardly, thus eliminating or at least reducing this tendency to distortion. This function of the collar 24 is particularly useful when the piston rod 13 is in its fully extended position, as seen in FIG. 6, because that is when the grooves 30,31 through which the fluid will flow are nearest to the sealing element 17.

A further feature of the collar 24 is that it has a conically-shaped end face 26. In this case, the end face 26 is designed to enter into engagement with the tapering inner profile 22 of the outer lip 21 of the sealing element 17. This is particularly advantageous in the manufacture of the damper. In the manufacturing process, a piston sub-assembly consisting of the piston assembly 10, piston rod 13, collar 24 and seal assembly 15, is inserted into the cylinder 11 after it has been filled with a measured quantity of damping fluid, with the cap 14 then being applied to close off the cylinder. If there is any slight misalignment of the seal assembly 15 in this process, then withdrawing the piston rod 13 to its fully extended position will bring the collar 24 into engagement with the sealing element 17 and hence serve to centre it by action of the conically-shaped end face 26 on the tapering inner profile 22 of the outer lip 21, as seen in FIG. 6. A similar effect might be achievable by providing a chamfered recess on the collar 24 to engage the tapering profile of the inner lip 20, or of course the collar could include both such features.

Here the collar 24 is provided as an independently movable component. Instead, however, it could be formed as a part 24' to be mounted onto the piston assembly 10, as seen in FIG. 7, or it could be formed as an integral part of the piston assembly.

A further feature of the damper seen in FIG. 1 is a series of axially extending relief channels 40 that are provided in the bore 27 of the cylinder 11 towards its end with the cap 14. The relief channels 40 come into operation in the assembly of the damper, and more specifically, during the step described above of inserting the piston sub-assembly into the fluid-filled cylinder.

When the cylinder 11 has been filled with a measured quantity of fluid, the piston sub-assembly is inserted into it to its fullest extent. At this point, if the fluid should contain any air bubbles, these will tend to percolate upwards and bleed out through the relief channels 40. This will continue until the lip 23 of the mobile seal assembly 15 settles level with the opening into the relief channels 40. This represents the uppermost limit of movement of the seal assembly 15, which is achieved when the piston assembly is in its fully inserted position, as illustrated in FIG. 3. The lowermost limit of movement of the seal assembly 15 is the position seen in FIG. 6, which is in the fully extended position of the piston rod 13.

FIG. 8 shows a somewhat different form of damper to that seen in FIG. 1. In the FIG. 8 damper, a compression spring 60 is located in the lower chamber, ie interposed between the piston assembly 10 and the plug 50. The purpose of the spring 60 is to bias the piston assembly 10 and hence also the piston rod 13 into its extended position. The two dampers are otherwise the same in terms of their method of assembly and operation.

Another somewhat different form of damper is seen in FIG. 9. In this case, the cap 14' is designed to fit into the end of the cylinder 11 via a sleeve 60 that extends into a counter-bored section 61 of the cylinder bore 27. The arrangement means that the sealing element 17 will engage with the inner surface of the sleeve 60, rather than with the cylinder bore 27 as is the case with the FIG. 1 damper. For convenience, the sleeve 60 may be designed to have the same internal diameter as the cylinder bore 27.

The cap 14' is designed to fit into the end of the cylinder 11 with the sleeve 60 forming a fluid tight joint with the counter-bored section 61. The seal assembly 15 still serves to seal off the upper chamber 12a. In this case, however, it does so by means of both its sealing element 17 and the sleeve 60.

The cylinder 11 still has relief channels 40' for bleeding off air in the manufacturing process, as in the case of the FIG. 1 damper. Here, however, the relief channels 40' are formed on the inner surface of the sleeve 60, rather than in the cylinder bore 27.

The invention claimed is:

1. A piston and cylinder damper having a cylinder with a piston assembly mounted for reciprocal movement therein, and dividing the cylinder into separate chambers with a restricted flow path for passage therebetween of oil contained within the cylinder, and apiston rod mounted for reciprocal movement with respect to the cylinder and acting via a first chamber of said separate chambers on the piston assembly in at least a first direction, with a seal assembly sealing between the piston rod and the cylinder, or a part attached thereto, in order to retain damping fluid in said first chamber, the damper further including one or more relief channels in a bore of the cylinder arranged to a bleed off of air bubbles from within the oil in said first chamber, wherein said one or more relief channels are arranged to be closed off in normal use by the seal assembly.

2. A damper as claimed in claim 1 wherein said seal assembly is movable with respect to the cylinder.

3. A damper as claimed in claim 2 wherein said seal assembly is under spring bias.

4. A damper as claimed in claim 1 wherein the cylinder has a part attached thereto in the form of a sleeve, and wherein the seal assembly provides a seal between the piston rod and said sleeve in order to retain damping fluid in said first chamber.

5. A damper as claimed in claim 4 wherein the relief channels are provided on said sleeve.

\* \* \* \* \*